United States Patent [19]
Seki et al.

[11] Patent Number: 5,146,402
[45] Date of Patent: Sep. 8, 1992

[54] PROFILE DEFINITION METHOD

[75] Inventors: Masaki Seki; Takashi Takegahara, both of Tokyo; Takeshi Arakaki, Yamanashi, all of Japan

[73] Assignee: Fanuc Ltd., Yamanashi, Japan

[21] Appl. No.: 465,224

[22] PCT Filed: Jun. 16, 1989

[86] PCT No.: PCT/JP89/00605

§ 371 Date: Feb. 15, 1990

§ 102(e) Date: Feb. 15, 1990

[87] PCT Pub. No.: WO89/12855

PCT Pub. Date: Dec. 28, 1989

[30] Foreign Application Priority Data

Jun. 17, 1988 [JP] Japan .................................. 63-149300

[51] Int. Cl.⁵ ...................... G06F 15/46; G05B 19/18
[52] U.S. Cl. .................. 364/191; 364/474.26; 364/474.22
[58] Field of Search .............. 364/191, 192, 474.22, 364/474.23, 474.24, 474.26, 474.27, 474.32

[56] References Cited

U.S. PATENT DOCUMENTS

| | | | |
|---|---|---|---|
| 4,939,635 | 7/1990 | Seki et al. | 364/191 |
| 4,962,472 | 10/1990 | Seki et al. | 364/900 |
| 5,006,977 | 4/1991 | Seki et al. | 364/192 |
| 5,021,966 | 6/1991 | Seki et al. | 364/474.26 |

Primary Examiner—Jerry Smith
Assistant Examiner—Paul Gordon
Attorney, Agent, or Firm—Staas & Halsey

[57] ABSTRACT

A method for defining a profile in an automatic programming system containing previously designated figure elements. Only figure elements which intersect a designated starting point are provided for selection in defining a profile element. Upon selection of a figure element, only points which intersect the figure element along the direction selected are provided for selection of the endpoint of the profile element. Once the starting point and endpoint are selected, the profile element is stored as part of the profile. The endpoint is made a new starting point and the process is repeated until the endpoint selected is the original starting point, at which time the profile has been completely defined.

11 Claims, 9 Drawing Sheets

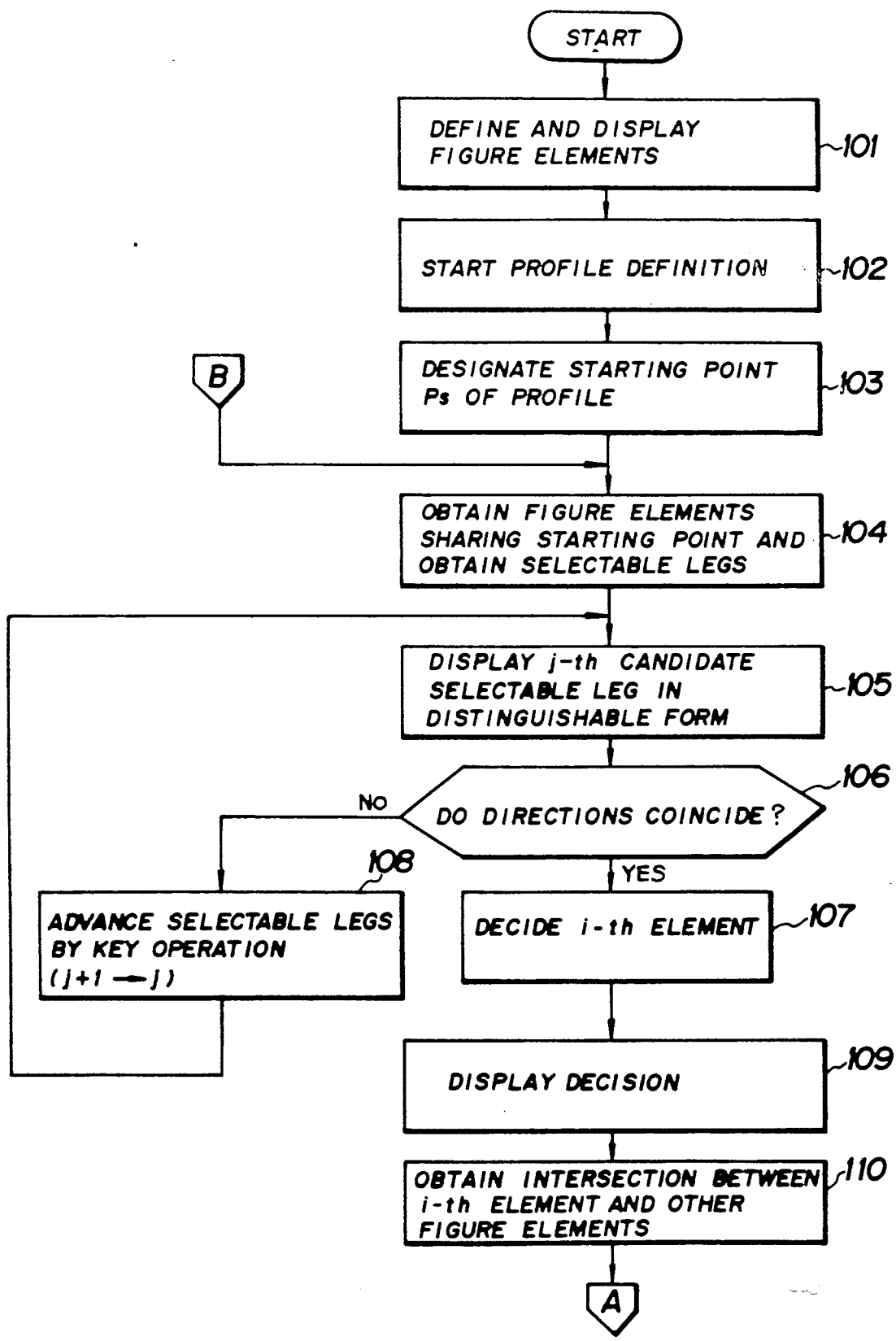

PROFILE DEFINITION METHOD

TECHNICAL FIELD

This invention relates to a method of defining a profile and, more particularly, to a profile definition method for defining a profile in an automatic programming system using figure elements such as defined straight lines and circles.

BACKGROUND ART

In automatic programming for creating NC data using an automatic programming language such as APT (automatically programmed tools) or FAPT, (a) a part program based on the automatic programming language is created by defining points, straight lines and circular arcs using simple symbols (this is referred to as "figure definition"), and defining a profile using these defined points, straight lines and circular arcs (referred to as "motion statement definition"), and (b) the part program based on the automatic programming language is subsequently converted into NC data, which comprises NC (numerical control) data (EIA codes or ISO codes) in a format capable of being executed by an NC unit.

In accordance with this profile definition method in an automatic programming system, the conventional practice is to display the figure elements such as the defined straight lines and circles on a display screen, designate the starting point of the profile and then designate the abovementioned figure elements one at a time in order starting from the starting point to define the profile. For example, in a case where a profile OLF [displayed in the form of a bold, solid line in FIG. 12(b)] is defined using already defined straight lines S1–S5 and an already defined circular arc C1 shown in FIG. 12(a), the profile is specified by selecting a starting point Ps using a tablet device, then selecting a figure element portion (a profile constituent element) E1 between the starting point and the next point of intersection P1, and thereafter selecting figure elements in the same manner. GCS is FIG. 12(b) denotes a graphic cursor.

In accordance with this conventional method, all of the defined figure elements must be displayed on the display screen and the profile constituent elements must be selected from these figure elements. In other words, in the prior art, the required profile constituent elements must be selected from all of the figure elements on the display screen while being verified visually. In this conventional method, however, the selectable profile constituent elements are all figure elements. Consequently, when designations are made on the screen, errors sometimes arise owing inadvertent selection of other elements or selection of figure elements which do not intersect with the previously defined figure element. Such selection errors occur with greater frequency the larger the number of defined figure elements.

An object of the present invention is to provide a profile definition method in which the number of selection candidates can be reduced to enable error-free selection of profile constituent elements quickly and easily.

DISCLOSURE OF THE INVENTION

The method of the invention includes obtaining, when a starting point of a profile has been designated, a plurality of figure elements which share the starting point as an extremal point, obtaining a first element of the profile by designating a forward direction of the profile from the starting point using the obtained figure elements, obtaining a point of intersection between the obtained first element and a figure element located ahead in the designated forward direction, deciding an end point of the first element of the profile by selecting it from a plurality of the intersections if the obtained intersections are plural in number, adopting the end point of the first element of the profile as a new starting point and successively obtaining subsequent elements of the profile, thereby finally deciding the profile. In accordance with the present invention, the number of selection candidates can be reduced so that profile constituent elements may be selected quickly, easily and without error.

BRIEF DESCRIPTION OF THE DRAWINGS

FIGS. 3(a) and 3(b) are flowcharts of processing according to the invention;

BEST MODE FOR CARRYING OUT THE INVENTION

Figure 1:
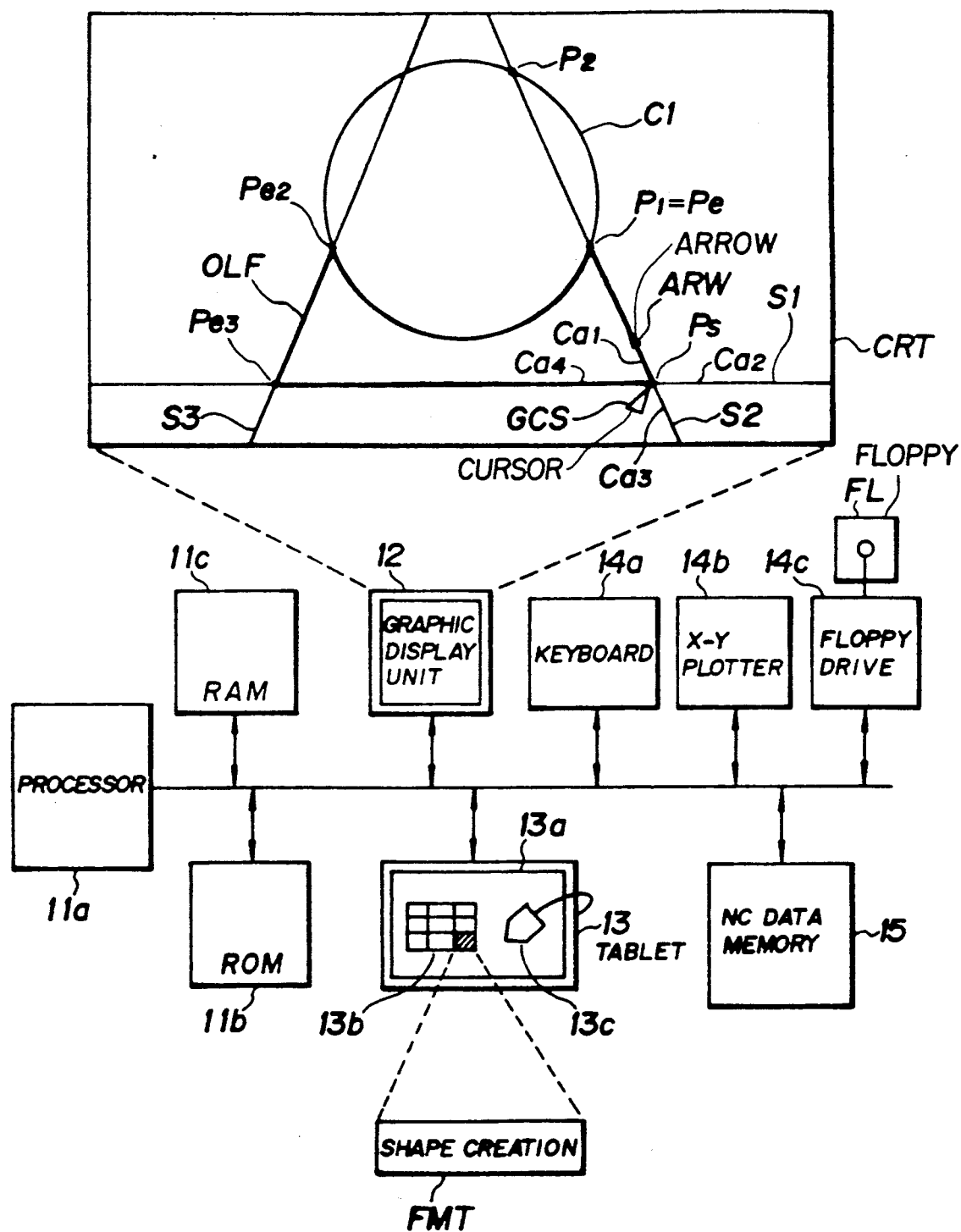
FIG. 1 is a block diagram of an automatic programming apparatus for practicing the present invention.

FIG. 1 is a block diagram of an automatic programming apparatus for practicing the present invention.

Numeral 11a denotes a processor, 11b a ROM, 11c a RAM for storing defined figure elements and profiles, 12 a graphic display unit, 13 a tablet device, 14a a keyboard, 14b an X-Y plotter, and 14c a floppy drive. FL represents a floppy, and 15 an NC data memory for storing created NC data.

CRT represents a display screen, Si (i=1, 2, 3) linear figure elements, C1 a circular figure element, Pi points of intersection between figure elements, Ps a starting point of a profile OLF, Pei (i=1, 2 ...) end points of respective profile constituent elements, ARW a displayed arrow and GCS a graphic cursor.

The tablet device 13 includes a tablet surface 13a, a menu table 13b, and a tablet cursor 13c. The menu table 13b is affixed to the tablet surface 13a, and various items and data can be entered by using the tablet cursor 13c to select prescribed items written on the menu table 13b. Moving the tablet cursor 13c on the tablet surface causes the graphic cursor GCS to move on the display screen.

Figure 2:
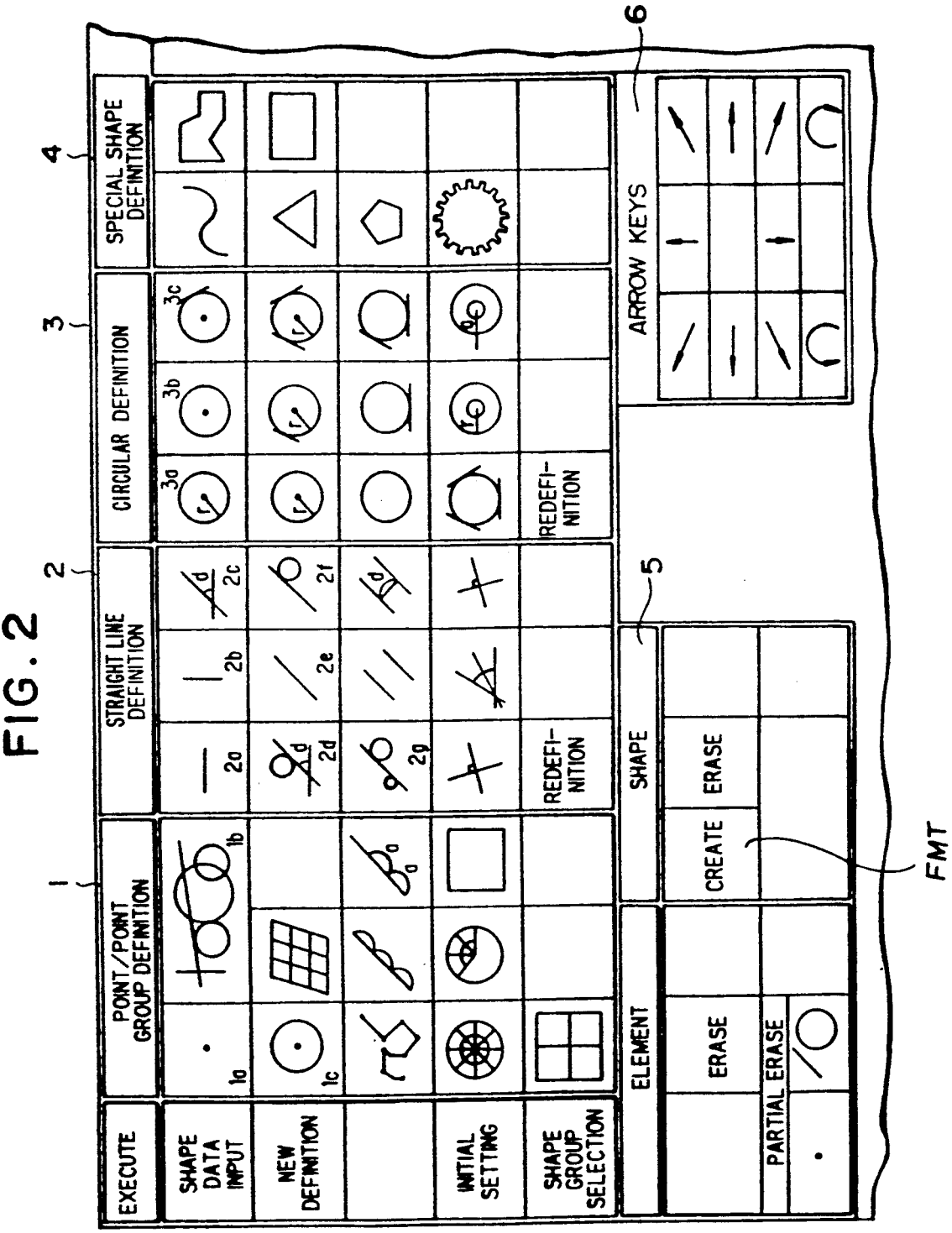
FIG. 2 is a view for describing the principal portions of a menu according to the present invention.

FIG. 2 is a view for describing the principal portions of the menu table 13b, in which numeral 1 denotes a "POINT/POINT GROUP DEFINITION" section, 2 a "STRAIGHT LINE DEFINITION" section, 3 a "CIRCULAR DEFINITION" section, 4 a "SPECIAL SHAPE DEFINITION" section, 5 a "SHAPE CREATION" section, and 6 an "ARROW KEY DESIGNATION" section. FMT in the "SHAPE CREATION" section 5 represents a "SHAPE CREATION" item, and "→, ↑, ♭, ↓" in the "ARROW KEY DESIGNATION" section 6 are arrow keys for designating direction. Such arrow keys are disposed on the keyboard 14a in a similar manner. When an arrow key is mentioned hereinafter, it will refer to an arrow key on the keyboard.

A general description of profile definition according to the present invention now follows. Referring to FIG. 1, when the starting point Ps of the profile OLF (the bold, solid line) has been designated, a plurality of selectable legs Ca1−Ca4 sharing this starting point Ps as an extremal point are obtained for designating the possible forward directions along the profile on the figure elements that Ps intersects. The forward direction of the profile OLF from the starting point Ps is selectively displayed by an arrow ARW and designated. Thus is obtained the first element Ca1 of the profile OLF. A point of intersection between the first element Ca1 and the figure element C1 lying ahead in the designated forward direction is then obtained. If there is only one point of intersection, this intersection is adopted as the end point $Pe_1$ of the first element of the profile OLF. If a plurality of points of intersection are obtained, a selection is made from among the plural intersections (e.g., $P_1$, $P_2$), thereby deciding the end point $Pe_1$ of the first element of the profile OLF. Thereafter, the end point of the first element of the profile OLF is adopted as a new starting point and the next element of the profile OLF is obtained. Subsequent elements are successively obtained in the same manner, thereby ultimately defining the profile as the set of the elements obtained (profile elements).

Figure 3B:
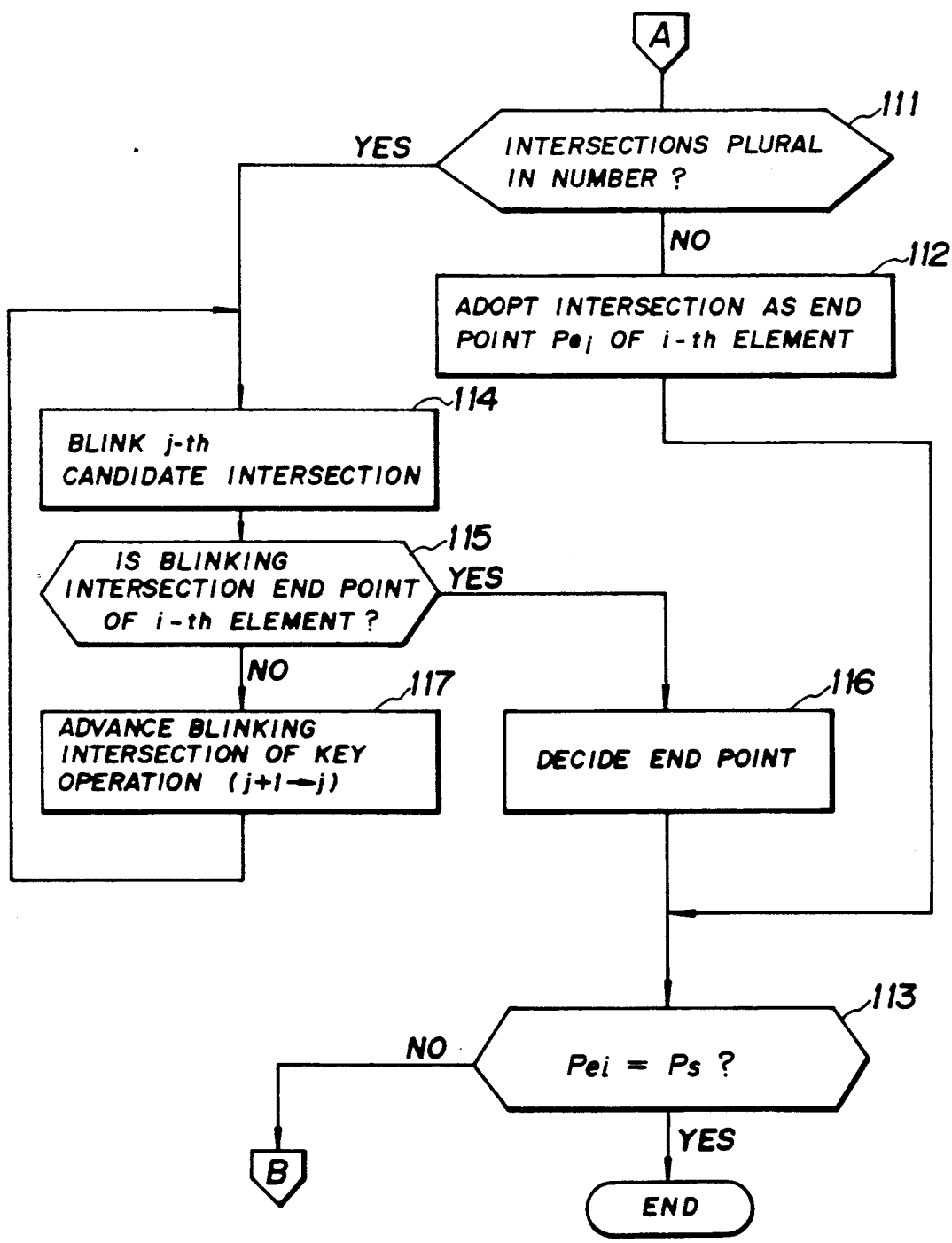

FIG. 3 is a flowchart of processing according to the present invention, and FIGS. 4 through 11 are examples of dialog screens of the present invention. The profile definition method according to the invention will now be described in accordance with these diagrams. It should be noted that a system program and the like for defining profiles are loaded in the RAM 11c from the floppy FL prior to processing.

Figure 4:
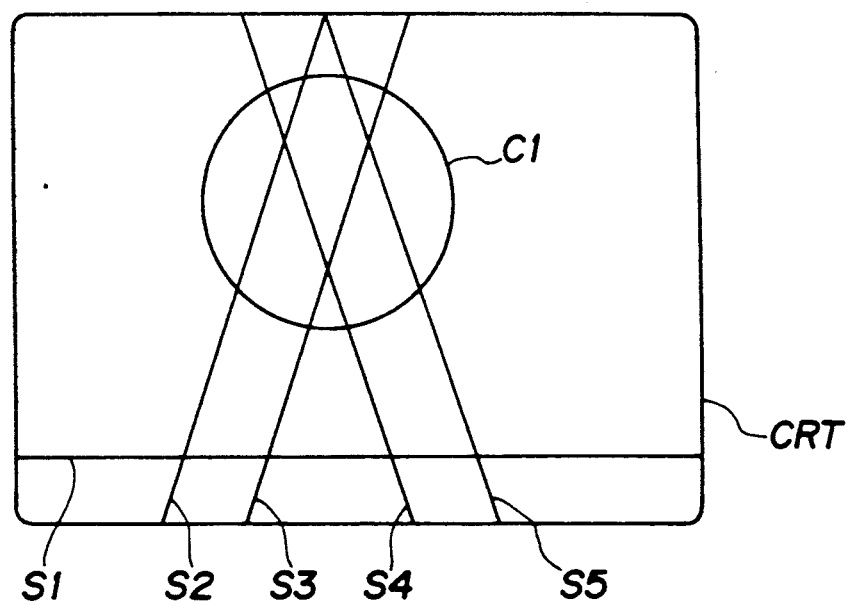
FIG. 4 is a dialog screen illustrating defined figure elements.
Figure 5:
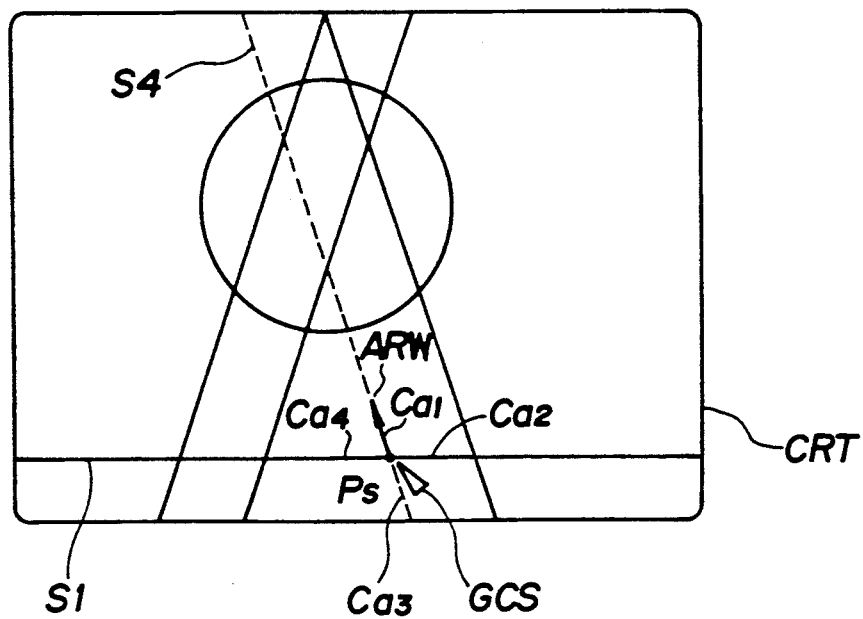
FIG. 5 is a dialog screen illustrating the starting point of a profile and the forward direction of this starting point.
Figure 6:
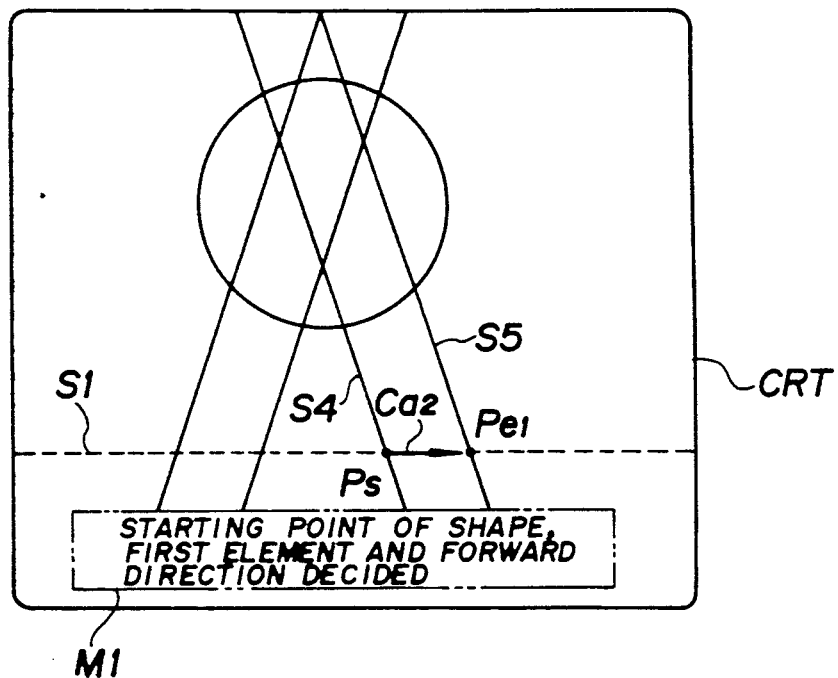
FIG. 6 is a dialog screen following determination of a first element.
Figure 7:
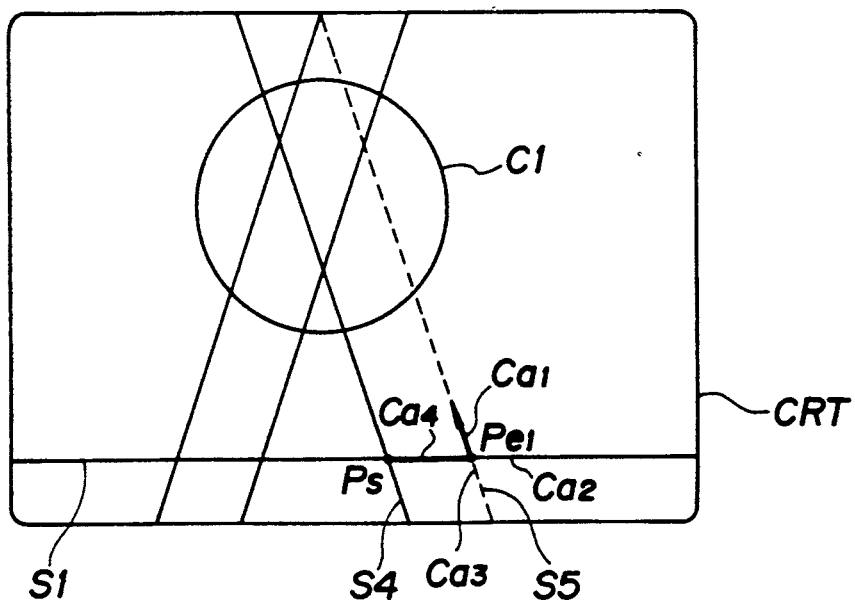
FIG. 7 is a dialog screen illustrating the forward direction from an end point of the first element.

A figure consisting of points, straight lines and circles is defined by direct input of coordinates using the tablet device 13 and keyboard 14a or by referring to a figure displayed on the display screen CRT. The defined figure is stored in the RAM 11c and painted on the display screen CRT (step 101). FIG. 4 is a dialog screen on which a figure consisting of the straight lines S1-S5 and circle C1 is defined by this method.

In a case where the profile is defined starting from a state in which the figure elements have been defined, the operator selects the "SHAPE CREATION" item FMT from the menu table shown in FIG. 2. When this is done, the processor 11a causes a prompt calling for the selection of the profile starting point to be displayed on the CRT and causes the graphic cursor GCS to be displayed on the CRT (step 102).

In response, the operator places the graphic cursor GCS on the point of intersection Ps (FIG. 5), which is to be the original starting point of the profile and selects this point (step 103).

When this is done, the processor 11a stores the intersection Ps as the starting point of the first element, obtains the figure elements S1, S4 sharing the starting point Ps, and then obtains four types of selectable legs Ca1–Ca4 that are for designating the forward direction along the profile from the starting point Ps (step 104).

Thereafter, the forward direction of the first candidate Ca1 among the four selectable legs is displayed with the attached arrow ARW and the color of the element S4 is displayed differently from the others (as a broken line ). This is step 105.

The operator determines whether this so distinguished selectable leg is an element of the profile and whether the direction of the arrow coincides with the forward direction of the profile (step 106). If there is coincidence, the operator presses the "NL" key on the keyboard to decide the first element (step 107).

If the direction of the distinguished selectable leg does not coincide with the direction of the profile, or in other words, if this selectable leg is not an element of a first candidate, it is determined at which numbered location in the counter clockwise direction from the first candidate the required candidate (selectable leg) is present. Thereafter, the counterclockwise arrow key is pressed a prescribed number of times to select the required candidate and display it by an arrow (step 108). It is permissible to adopt an arrangement wherein it is determined at which numbered location in the clockwise direction the prescribed candidate is located and then press the clockwise key 0 one time to display the candidate by an arrow. In this example, the key would be pressed once to display the candidate Ca2 by the arrow, after which the "NL" key is pressed (see FIG. 6). When this is done, a comment Ml is displayed to indicate that the starting point, first element and forward direction have been specified (step 109).

Next, the processor 11a obtains the point of intersection with the element S5 lying ahead in the forward direction of the first element S1 (step 110). It is determined whether there are a plurality of these points of intersection (step 111). If there is only one intersection, this intersection is adopted as the end point $Pe_1$ of the first element and the segment from Ps to $Pe_1$ is stored in the RAM 11c as a portion of the profile (profile element) (step 112). If there are no points of intersection, there is an error.

Next, it is determined whether the end point $Pe_1$ coincides with the original starting point Ps (step 113). If it does not coincide, the end point $Pe_1$ is taken as being a new starting point and the program jumps to step 104. Processing from this point onward is repeated and definition of the profile is terminated when coincidence between the endpoint and the original starting point is achieved. Since coincidence is not achieved in this example, the end point $Pe_1$ is taken as being a new starting point. Selectable legs Ca1–Ca4 sharing this starting point as an extremal point are obtained from figure elements $S_1$ and $S_2$, arrow ARW is displayed on first candidate selectable leg Ca1 from among the four types of selectable legs for the purpose of designating the forward direction along the profile from the starting point Pe1. The color of the figure element S5 containing the first candidate selectable leg is displayed differently from that of the others (see FIG. 7. Thereafter the required candidate is designated in a manner similar to that set forth above. This is the processing achieved by steps 104-109.

Figure 8:
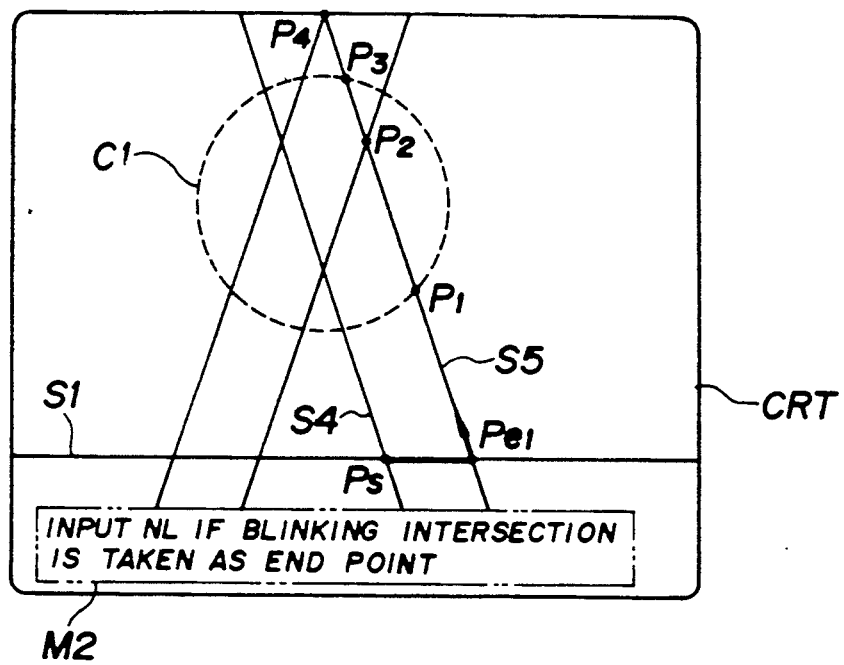
FIG. 8 is a dialog screen for a case where there are a plurality of points of intersection.

In a case where points of intersection Pi (i=1, 2, ... 4) with another element C1 lying ahead in the forward direction of the designated element are plural in number, a "YES" answer is received at step 111, a first candidate P1 among these intersections blinks and a message M2 is displayed (see FIG. 8 and step 114).

In response to message M2, it is determined whether the blinking intersection P1 is an end point (step 115). If it is an end point, the "NL" key is pressed and the end point of the next element of the profile (profile element) is specified (step 116).

If the first candidate intersection P1 is not an end point, then a candidate intersections is selected by using the arrow key "♭" (advance) or "→" (retreat) to advance or retreat the blinking candidate intersection. When the desired intersection is displayed the required end point is specified (step 117).

Figure 9:
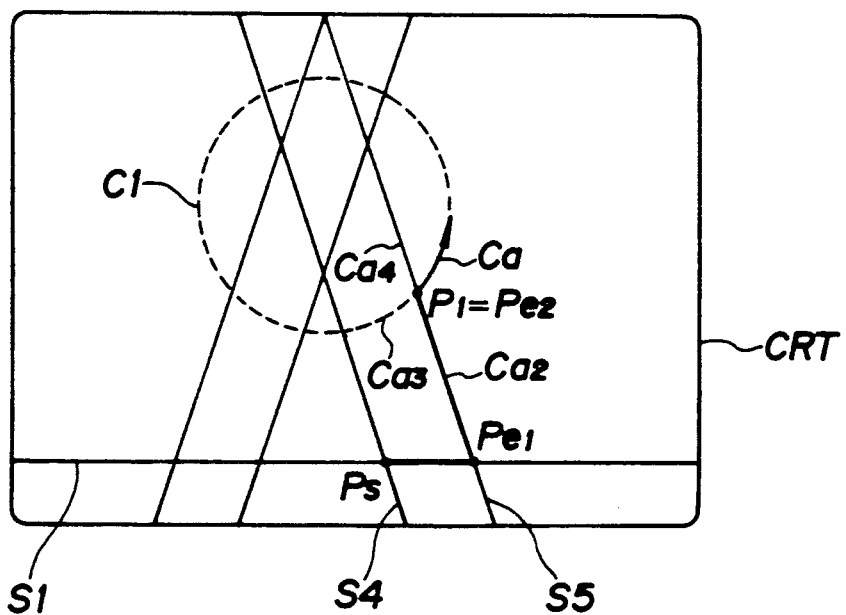
FIG. 9 is a dialog screen illustrating the forward direction from an end point of a second element.

In this example, the point of intersection P1 is taken as being the end point $Pe_2$ of the next element of the profile (profile element ) (see FIG. 9).

Thereafter, the program jumps to step 113, where it is determined whether the end point $Pe_2$ coincides with the original starting point Ps. If the two points do not coincide, the end point Pe2 is taken as being a new starting point and processing from step 104 onward is repeated. Since coincidence is not achieved in this example, the first candidate selectable leg Ca1 from among the four types of selectable legs for the purpose of designating the forward direction along the profile from the starting point Pe2 is displayed as the arrow and the color of the figure element C1 is displayed differently from that of the others.

Figure 10:
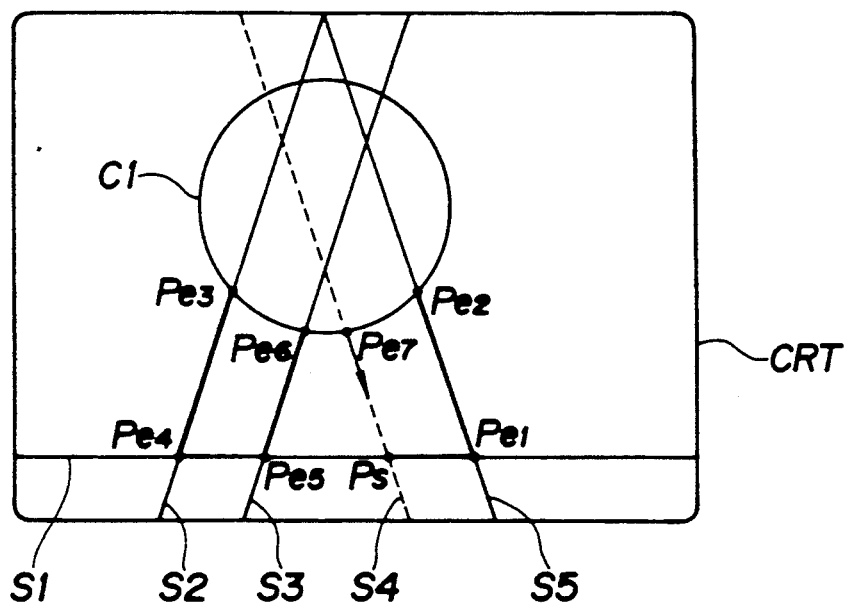
FIG. 10 is a dialog screen illustrating the final stage of profile definition.
Figure 11:
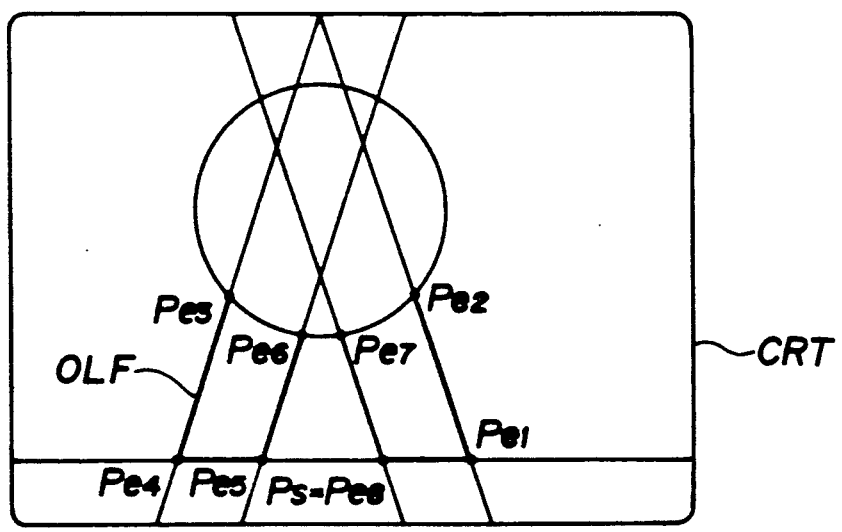
FIG. 11 is a dialog screen illustrating a defined profile.
Figure 12A:
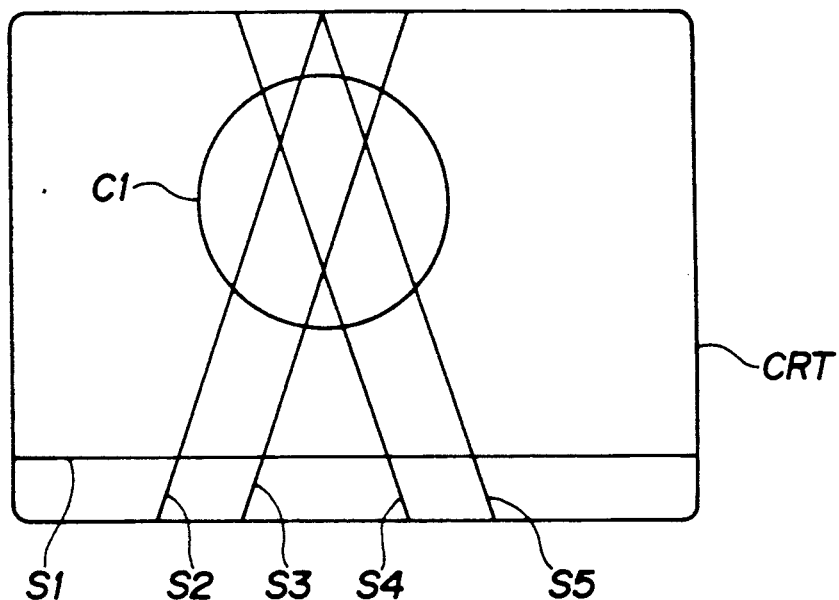
FIGS. 12(a) and 12(b) are views for describing an example of the prior art.
Figure 12B:
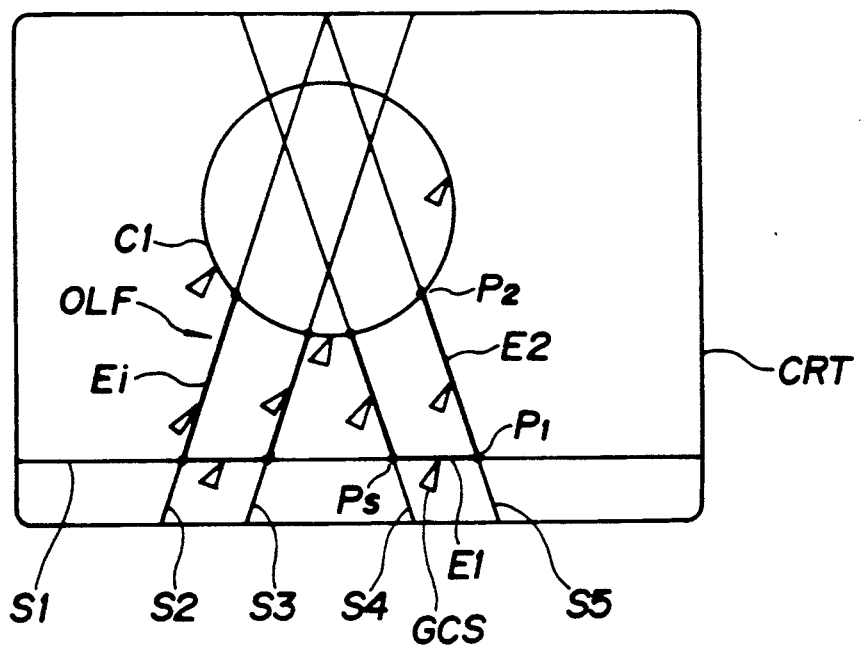

Thereafter, and in similar fashion, end points Pei (i=2 ... 7), elements and forward direction are specified, as shown in FIG. 10, and the end point $Pe_8$ eventually becomes superimposed on the starting point Ps in FIG. 11, as a result of which the profile OLF is specified and profile definition processing is terminated.

Thus, in accordance with the present invention, the arrangement is such that the number of selectable candidates can be reduced and the profile designating means can be simplified. As a result, error-free profile definition can be performed more quickly and more easily.

We claim:

1. A profile destination method for defining a profile by displaying defined figure elements on a display screen, designating a starting point of the profile, and designating said figure elements in an order starting from said starting point, characterized by:
    (a) obtaining, when the starting point of the profile has been designated, the figure elements which share said starting point as an extremal point;
    (b) obtaining a first element of the profile by designating a forward direction of the profile from said starting point along one of said figure elements obtained in step (a);
    (c) obtaining a point of intersection between said first element and one of the figure elements that intersects said first element along the forward direction designated in step (b);
    (d) deciding that this point of intersection is one in point of the first element of the profile if the point of intersection obtained in step (c) is one in number;
    (e) deciding the end point of the first element of the profile by selecting one point of intersection from the intersections if more than one point of intersection is obtained in step (c); and
    (f) assigning the end point of the first element of the profile as a new starting point and successively obtaining subsequent elements of the profile by performing steps (a) through (f).

2. A profile definition method according to claim 1, wherein step (b) includes:
    (b1) displaying a first candidate figure element from among the figure elements having said starting point as an extremal point, in a form distinguishable from the other figure elements;
    (b2) storing data to specify the forward direction if the forward direction of the profile to be designated and a direction of the figure element displayed in distinguishable form are the same; and
    (b3) successively displaying figure elements in distinguishable form in one of a clockwise and a counterclockwise direction and repeating steps (b2) and (b3) if the forward direction of the profile to be designated and a direction of the figure element are different.

3. A profile definition method according to claim 2, wherein in step (b1) an arrow is attached to each of said figure elements displayed in distinguishable form to designate the forward direction of the figure.

4. A profile definition method according to claim 2, wherein the profile is defined by successively defining elements by repeating steps (a) through (f) until the end point of a next element becomes superimposed on said starting point.

5. A method for defining a profile having profile elements in an automatic programming system in which figures, having figure elements, have been designated comprising the steps of:
    (a) storing profile elements selected from only those figure elements that intersect a starting point that has been designated to be in the profile;
    (b) storing endpoints of the profile elements selected from only those points on the figure that intersect the figure elements selected for storing in said step (a); and
    (c) obtaining the profile elements by first selecting a forward direction along one of only those figure elements that intersect the starting point and by second selecting the endpoints from only those points on the figure that intersect the figure element along the forward direction selected.

6. A method for defining a profile in an automatic programming system in which figures, having figure elements, have been designated, comprising the steps of:
    (a) storing an original starting point that has been designated as a starting point for selecting the first of a plurality of profile elements;
    (b) displaying forward directions of all figure elements that intersect the starting point, for selection of the forward direction along which the profile is to proceed;
    (c) displaying all points on the figure that intersect the figure element along the forward direction that has been selected, for selection of an endpoint;
    (d) storing a profile element defined by the starting point and the endpoint;
    (e) comparing the endpoint to the original starting point;
    (f) assigning to the starting point the location of the endpoint when coincidence between the endpoint and the original starting point is not achieved, (g) repeating steps (b)-(f); and when coincidence between the endpoint and the original starting point is achieved, (h) terminating definition of the profile and storing the profile elements as a complete definition of the profile.

7. A method according to claim 6, wherein step (b) further comprises the step of: p1 (b1) displaying the forward directions in a form distinguishable from those of the figure elements that do not intersect the starting point.

8. A method according to claim 6, wherein step (b) comprises the steps of:
   (b1) displaying one of the forward directions in a distinguishable form, the selection of the forward direction along which the profile is to proceed;
   (b2) displaying different ones of the forward directions in a distinguishable form for selection of a forward direction other than the one currently displayed.

9. A method according to claim 6, wherein step (c) further comprises the step of:
   (c1) displaying the points on the figure that intersect the figure element along the forward direction that has been selected in a form distinguishable from the other points on the figure.

10. A method according to claim 6, wherein step (c) comprises the steps of:
    (c1) displaying one of the points in a distinguishable form, for selection of the endpoint;
    (c2) displaying different ones of the points in a distinguishable form for selection of a point other than the one currently displayed.

11. A method according to claim 10, further comprising the step of:
    (c3) automatically selecting the endpoint when only one point on the figure intersects the figure element along the forward direction that has been specified.

* * * * *